Nov. 30, 1926.
C. M. SCOTT
CULTIVATING MACHINE
Filed Oct. 15, 1925  2 Sheets-Sheet 1
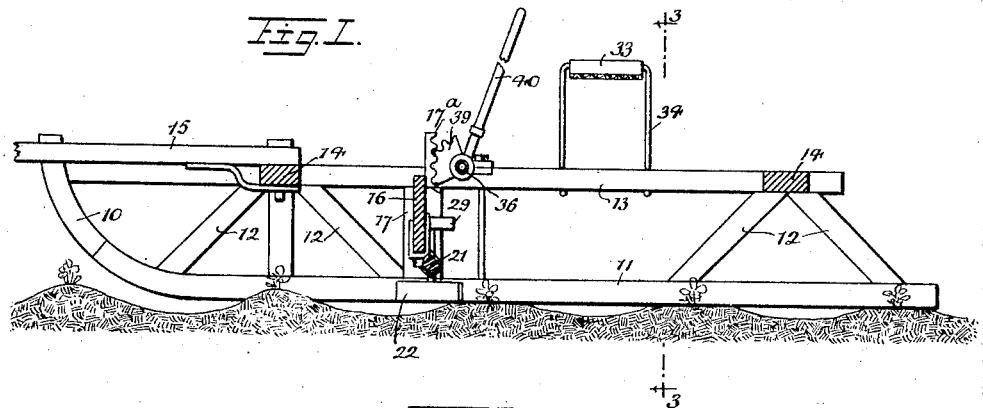

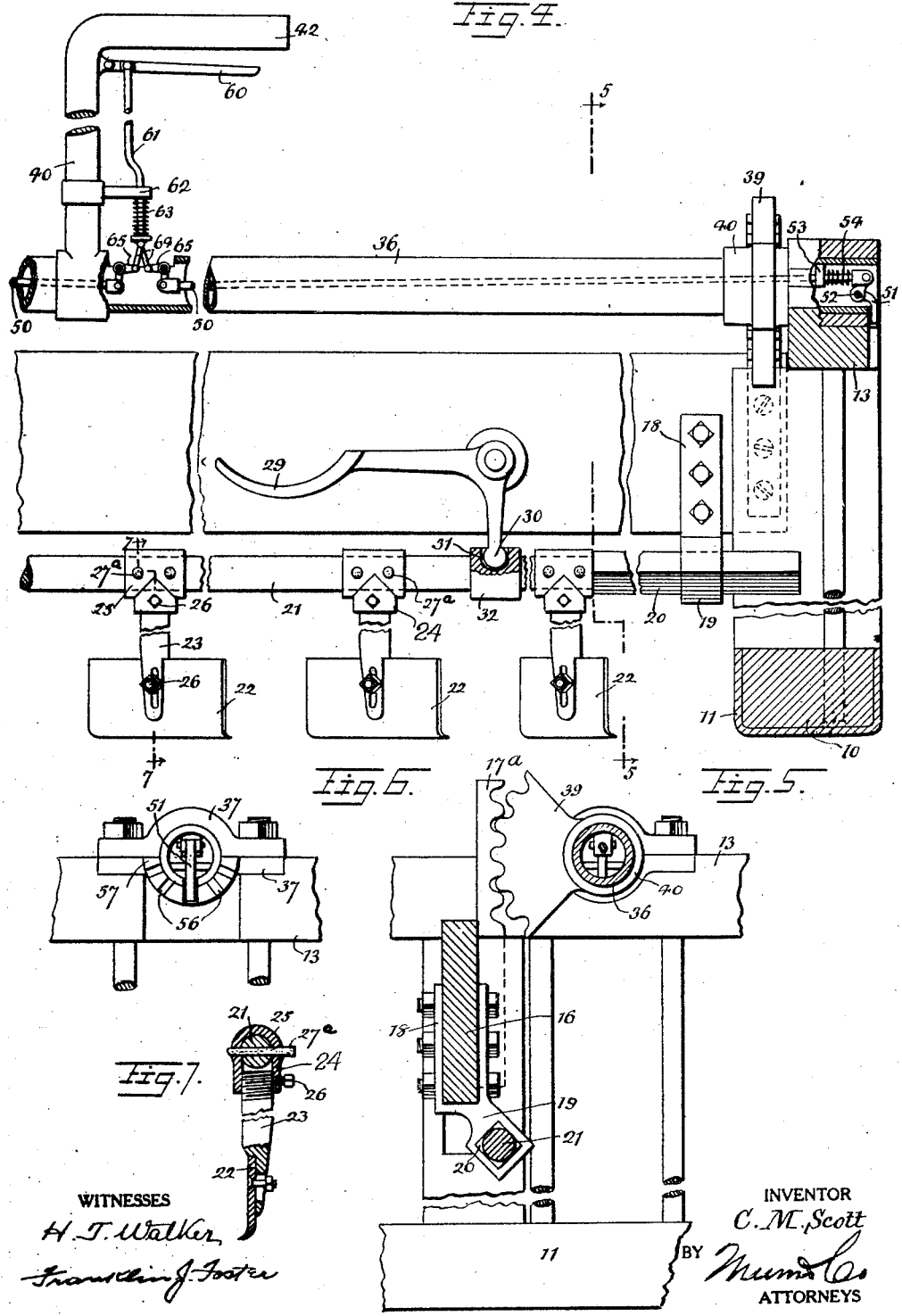

Patented Nov. 30, 1926.

1,608,675

UNITED STATES PATENT OFFICE.

CHARLES MORTON SCOTT, OF NETTLETON, MISSISSIPPI.

CULTIVATING MACHINE.

Application filed October 15, 1925. Serial No. 62,566.

The cultivating machine of the present invention is primarily intended for thinning out rows of young cotton plants or sugar beets, and is in the nature of a sled adapted to be pulled crosswise of the rows, and carrying a set of tools for effecting the chopping or thinning of the rows.

Preferably the machine includes a vertically adjustable beam carrying a set of scrapers spaced at the proper distances apart to thin the rows of plants in the desired manner. Preferably also, this beam is both vertically and transversely adjustable to effect elevation or side-wise shifting of the scrapers.

An object of the invention is to provide a machine of the general character above noted, which is of rugged and durable construction, which may be manufactured with comparative economy, and which will be highly efficient in operation.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a view in longitudinal section of a machine embodying the invention, this view being taken on the staggered line 1—1 of Fig. 2.

Fig. 2 is a plan view of the machine.

Fig. 3 is a transverse section on the line 3—3 of Fig. 1.

Fig. 4 is a broken fragmentary view, partly in rear elevation, and partly in section, showing the adjustable beam and its associated operating mechanism.

Fig. 5 is a transverse section on the line 5—5 of Fig. 4.

Fig. 6 is an end view of the rotating operating shaft, one of its bearings, and the locking mechanism.

Fig. 7 is a sectional detail on the line 7—7 of Fig. 4.

The frame work of the machine is of the general nature of a sled or drag, including runners 10, which may be shod with steel as indicated at 11. Supported above the runners on struts 12 are the longitudinally extending beams 13 connected by transverse beams 14. A draw bar 15 is secured to the forward beam 14 in any suitable, conventional or convenient manner. It is to be noted that the runners are relatively long, so that they will bridge the furrows between several adjacent rows of plants, and will offer a substantial bearing for the machine as best seen in Fig. 1. A vertically adjustable cross beam 16 has its ends guided for vertical sliding movement between pairs of uprights 17 which connect the runners 10 and beams 13. At opposite ends, the beam 16 carries racks 17ª operated in a manner to be later described, to effect vertical movement of the beam. Hangers 18 bolted to opposite ends of the beam 16, are formed with squared off-set bearing portions 19 for receiving the squared ends 20 of a shaft 21, upon which the scrapers 22 are hung.

Each scraper 22 is bolted to a shank 23 (Fig. 7), said shanks being rotatably adjustable in sockets 24, forming parts of T-couplings 25 fixed upon the shaft 21. By rotating the shanks 23 in their sockets, and subsequently locking them with a set screw 26, the angular relation of the scrapers to each other and to the work may be readily adjusted and predetermined. To secure the T-couplings 25 on the shaft 21, I drive wooden pins 27ª through aligned openings in the shaft and couplings. If one of the scrapers strikes a rock, stump, or similar obstruction, the wooden pins will snap under the impact and permit the scraper to swing rearwardly on the shaft 21 without injury.

To permit a slight endwise adjustment of shaft 21, I mount a pair of oppositely facing bell crank pedal levers 27 on fulcrums 28 projecting from the rear face of the beam 16. The free ends of these levers are formed with pedal portions 29 under control of the operator, and the opposite ends of the levers are rounded at 30 to fit sockets 31 formed in collars 32, secured to the shaft 21. Depression of one lever will slide the shaft 21 axially in one direction, and depression of the other lever will effect a reverse movement thereof, as will be readily apparent from Figures 3 and 4 of the drawings.

The operator's seat preferably comprises a piece of canvas or belting 33, secured between angular spring metal frames 34, bent around and secured to the beams 13 as at 35, and projecting inwardly and upwardly. The pedals are within convenient reach of an operator on the seat.

To effect vertical adjustment of the scraper beam 16, I journal a tubular transverse shaft 36 in sectional bearings 37 carried by the beams 13. Collars 38 fixed to the shaft 36 adjacent the ends thereof abut the sectional bearings, and prevent endwise shifting of the shaft. These collars carry, or are integral with toothed sector plates 39 meshing with the racks 17ª, so that rotation of the shaft 36 will effect raising or lowering of the racks and the beams 16 which they carry. The shaft 36 may be conveniently rotated by hand lever 40 fixed to a collar 41 on the shaft, and provided with an offset handle extension 42.

The following mechanism is utilized for locking the shaft 36 in any desired position of rotational adjustment, consequently locking the scraper beam at any desired elevation. Pairs of pull bars 50 housed within the tubular shaft 36, are connected at their outer ends to bell cranks 51 pivoted on cross pins 52. Guide brackets 53 support the outer ends of the pull bars 50, and serve as bearing plates for coiled expansion springs 54 tending to urge the pull bars outwardly, and rotate the fingers of the bell cranks into locking engagement with a series of notches 56, in a segment plate 57, preferably integral with the lower section of the sectional bearing 37. To retract the fingers 51 out of engagement with the notches 56, and permit free rotation of the tubular shaft 36, I employ a lever 60 pivoted at one end to the lever 40, and extending under the handle extension 42 thereof. The lever 60 may thus be conveniently grasped in grasping the handle section 42. Pivotally connected to the handle lever 60 is a vertical link 61, guided in a bracket 62, projecting laterally from the lever 40. A spring 63 normally urges the link 61 downwardly. This link under the influence of spring 63 acts upon a pair of links 64 to rotate a pair of bell cranks 65. These bell cranks are each connected at one end to the link 64, and at the other end to the inner ends of the pull bars 50. The spring 63 thus co-acts with the springs 54 to urge the pull bars outwardly and swing the fingers 51 into locking position.

It will be evident, that as the lever 60 is grasped and moved toward the handle extension 42, the link 61 will act through linkage 64 and crank levers 65 to pull the inner ends of the pull bars 50 toward each other, consequently rocking the fingers 51 out of engagement with their associated notches. When the lever 60 is firmly grasped, the handle 42 may be utilized to rock the shaft 36, and consequently effect vertical adjustment of the scraper beam 16.

From the foregoing description it will be apparent that I have provided a sled-like cultivating machine to be drawn transversely of the planted rows, and carrying a set of thinning tools or scrapers mounted upon a common support which is both transversely and vertically adjustable at the will of the operator. The scraper beam may be optionally locked in any position of vertical adjustment, either to regulate the depth of cutting of the scrapers, or to hold the scrapers in elevated position while the machine is being drawn to and from the field. The scrapers themselves are not only independently angularly adjustable relative to the work and to each other, but are so mounted that they cannot be accidentally broken when they strike a snag or obstruction.

It is believed that the operation of the machine will be evident from the above description without further discussion.

While the embodiment of the invention illustrated is a preferred one, it will be evident that various changes and alterations might be made in the general form and arrangement of parts described, without departing from the invention. Hence I do not wish to limit myself to the details set forth, but shall consider myself at liberty to make such changes and alterations as fairly fall within the spirit and scope of the appended claims.

I claim:

1. A machine of the class described, including a frame adapted to be drawn transversely of the rows of growing plants, a beam mounted for vertical sliding movement in the frame, a shaft supported on the beam, and mounted for axial shifting movement, and a series of spaced scrapers carried by the shaft.

2. A machine of the class described, including a frame adapted to be drawn transversely of the rows of growing plants, a beam mounted for vertical sliding movement in the frame, a shaft supported on the beam, and mounted for axial shifting movement, and a series of spaced scrapers carried by the shaft, manually operated means for raising and lowering the beam.

3. A machine of the class described, including a frame adapted to be drawn transversely of the rows of growing plants, a beam mounted for vertical sliding movement in the frame, a shaft supported on the beam, and mounted for axial shifting movement, and a series of spaced scrapers carried by the shaft, pedal operated means for axially shifting the shaft.

4. A machine of the class described, including a frame adapted to be drawn transversely of the rows of growing plants, a beam mounted for vertical sliding movement in the frame, a shaft supported on the beam, and mounted for axial shifting movement, and a series of spaced scrapers carried by the shaft, manually operated means for raising and lowering the beam, pedal operated means for axially shifting the shaft.

5. A machine of the class described, including a frame adapted to be drawn transversely of the rows of growing plants, a beam mounted for vertical sliding movement in the frame, a shaft supported on the beam, and mounted for axial shifting movement, and a series of spaced scrapers carried by the shaft, manually operated means for raising and lowering the beam, pedal operated means for axially shifting the shaft, and means permitting independent angular adjustment of the scrapers.

6. A machine of the class described, including a frame adapted to be drawn transversely of the rows of growing plants, a beam mounted for vertical sliding movement in the frame, a shaft supported on the beam, and mounted for axial shifting movement, and a series of spaced scrapers carried by the shaft, a breaking pin connection between the scrapers and the shaft, whereby the scrapers may turn on the shaft when an obstruction is met.

7. A machine of the class described, including a sled-like frame, a scraper beam mounted transversely of the frame for vertical sliding movement therein, a series of spaced scrapers carried by the beam, pedal operated means for effecting simultaneous sidewise movement of the scrapers in either direction.

8. A machine of the class described, including a frame adapted to be dragged transversely of the rows of growing plants, a transverse scraper beam, guided for vertical movement in the frame, a transverse rock shaft mounted above the beam, means whereby movement of the rock shaft effects elevation or depression of the beam, and means automatically locking the rock shaft in various positions of adjustment, including spring urged fingers engaging with notches in the end bearings of the rock shaft.

9. In a machine of the class described, a frame adapted to be dragged transversely of the rows of growing plants, a transverse beam vertically adjustable in the frame, hangers depending from the beam, and including squared eyes, a transverse shaft having squared ends supported in the eyes for sliding movement therein, series of scrapers supported on the intermediate portion of the shaft.

10. In a machine of the class described, a frame adapted to be dragged transversely of the rows of growing plants, a transverse beam vertically adjustable in the frame, hangers depending from the beam, and including squared eyes, a transverse shaft having squared ends supported in the eyes for sliding movement therein, series of scrapers supported on the intermediate portion of the shaft, bell crank levers, each having one end engageable with the shaft, and each having their other end formed with a pedal extension, whereby the shaft may be pedal operated for sliding movement in the eyes to effect simultaneous lateral shifting of the scrapers.

CHARLES MORTON SCOTT.